UNITED STATES PATENT OFFICE 2,022,677

UREA COMPOSITION AND METHOD OF MAKING AND USING

Walter H. Kniskern, Petersburg, Va., and William C. Klingelhoefer, Syracuse, N. Y., assignors to Atmospheric Nitrogen Corporation, New York, N. Y., a corporation of New York No Drawing. Application May 4, 1934, Serial No. 723,926

11 Claims. (Cl. 71—9)

This invention relates to new compositions of matter comprising urea, carbon dioxide, and ammonium or alkali-metal salts of strong inorganic acids. Other materials may or may not be present, as desired. The invention further relates to processes for the preparation of such compositions and to the production of fertilizers therefrom.

The methods for the fixation of atmospheric nitrogen lately developed make available from this source large quantities of ammonia for industrial purposes and particularly for the production of fertilizers. In ammonia synthesis for the production of fixed nitrogen wherein the hydrogen employed is obtained from water-gas or similar gases containing compounds of carbon, large quantities of carbon dioxide are recovered as a by-product. This carbon dioxide may be utilized by combining it with the ammonia to form urea. The synthetic ammonia also may be reacted with strong inorganic acids such as nitric or hydrochloric acid to form the corresponding ammonium salts, or it may be oxidized so as to yield nitrogen oxides and these may be reacted directly with ammonia or alkali-metal salts or bases to form ammonium nitrate or an alkali metal nitrate or it may be reacted with water to form nitric acid which with ammonia gives ammonium nitrate.

Urea and ammonium salts, e. g. ammonium nitrate, and ammonium chloride, are desirable ingredients for fertilizer. The marketing of these products is, however, attended by difficulties and expensive operations. In their manufacture they ordinarily are first produced as aqueous solutions and hence in order to obtain them as solids additional expense must be incurred. Furthermore, the solid products possess some tendency to cake and therefore shipment or storage in solid form may render subsequent handling difficult.

It is frequently desirable to prepare a fertilizer containing both phosphorus and nitrogen and this may be done by treating mono-calcium-acid-phosphate materials, such as superphosphate or triple superphosphate, with ammonia. The ammonia serves not only to neutralize free acid present, but additional ammonia may be combined with the phosphate material, increasing the amount of nitrogen contained in the fertilizer. When relatively large proportions of ammonia are added to a superphosphate material, however, the ammonia tends to cause water-soluble and citrate-soluble phosphate to revert to a water-insoluble and citrate insoluble form which is not considered available as plant food. It is, moreover, often desirable to produce a fertilizer containing a higher proportion of nitrogen than obtainable by treating a superphosphate material with ammonia alone without causing excessive reversion of soluble phosphate.

It is an object of the present invention to prepare compositions containing urea, ammonia, and carbon-dioxide possessing a high nitrogen content which may be employed for the ammoniation of superphosphate materials to add relatively large proportions of nitrogen without excessive reversion of available phosphate.

It is a further object of the invention to prepare compositions which may be transported, stored, and handled with the greatest facility.

Further objects will be apparent from the following detailed description.

As indicated above, the product resulting from the synthesis of urea by reaction of ammonia and carbon dioxide in an autoclave ordinarily contains urea, ammonia, and carbon dioxide. By varying the reaction conditions, products of various compositions are obtained; thus by increasing the ratio of ammonia to carbon dioxide employed in the reaction, a product will be obtained containing diminished quantities of carbon dioxide and increased quantities of ammonia.

In general our invention is directed to the preparation of compositions comprising carbon dioxide, urea, ammonia, and an alkali-metal or ammonium salt of a strong inorganic acid and containing nitrogen, either in the acid or basic radical, or in both. Examples of such salts are ammonium nitrate, ammonium chloride, ammonium sulfate, sodium nitrate, and potassium nitrate. It is especially directed to such compositions in which the salt is ammonium nitrate or ammonium chloride.

The present invention is particularly suitable for the treatment of urea synthesis products containing insufficient carbon dioxide to combine with all of the ammonia present so that the material contains free ammonia. For the proper application of the present invention, consideration of the solution being treated is necessary; and the procedure to be followed should be varied to suit its initial composition.

Our invention finds especial application in the treatment of aqueous effluent from a urea synthesis autoclave. From this effluent solutions containing free ammonia (in addition to ammonia combined as ammonia-carbon dioxide salts), carbon dioxide, and urea may be formed possessing lower vapor pressures and lower salting out temperatures (i. e. crystallization commences at lower temperatures) than those of the effluent so that the resultant product may be transported or stored in containers not subjected to relatively high vapor pressures, with reduced danger of excessive loss of ammonia, and without crystallization of solid materials from solution.

With solutions containing urea, ammonia, and carbon dioxide, the tendency of the various constituents to crystallize out depends upon the ratios in which they are present. Thus with autoclave effluent possessing a relatively high urea content, urea or urea complexes tend to crystallize out before ammonium carbonate or other ammonia-carbon dioxide salts. On the other hand, with effluent possessing a relatively low urea content, the ammonia-carbon-dioxide salts first tend to crystallize. It has been found that the addition of an ammonium salt of a strong inorganic acid tends to lower the crystallization temperature of urea and urea complexes. Where, therefore, a solution is dealt with from which urea tends to crystallize earlier, i. e., at a higher temperature than ammonia-carbon-dioxide salts, the salting out temperature may be reduced by the addition of an ammonium salt of a strong inorganic acid to the solution. The effect is the opposite, however, on the salts of ammonia and carbon dioxide and the salting out temperature may be raised in those cases in which these salts tend first to crystallize from the solution. The various factors, therefore, present several alternative procedures for treating the effluent from a urea autoclave synthesis in the preparation of products of the present invention.

The desired nitrogen salt may be merely added to the effluent. It may be desirable, however, first to add the desired nitrogen salt and subsequently to crystallize a portion of the carbon dioxide salts from the solution. In this manner a part of the $CO_2$ salts may be removed and the salting out temperature reduced to the desired degree.

The addition of the aforementioned ammonium salts to a composition containing urea, ammonia, carbon dioxide, and water decreases the ratio of ammonia to carbon dioxide in the gaseous phase in equilibrium with the solution. Therefore, if either of these salts is added to the solution, and the solution is subsequently subjected to vaporization, carbon dioxide may be driven off as a gas without as great vaporization of ammonia as otherwise would be the case. Accordingly this characteristic may be utilized for reducing the ratio of carbon dioxide to ammonia in the final product.

If the solution contains an excess of urea,— that is, a content of urea such that this material crystallizes first from the solution upon cooling, it may be desirable, especially if the crystallization commences at temperatures in the neighborhood of atmospheric temperature, to first cool the solution and crystallize out a portion of the urea or urea complex. In this way a commercially pure urea product may be obtained from a portion of the urea in the solution and the salting out temperature may be simultaneously reduced. After this partial crystallization a nitrogen salt such as ammonium nitrate or ammonium chloride may be added to the solution so that the crystallization temperature of the urea is still further reduced.

Effluent from a urea autoclave in which a relatively high ratio of $NH_3:CO_2$ is used ordinarily contains between about 6% and about 15% $CO_2$, 35% and 45% urea, and 30% and 40% ammonia. By introducing an ammonium salt of a strong inorganic acid in accordance with the present invention, a product may be obtained therefrom containing between about 2% and about 14% $CO_2$, about 10% and about 40% urea, about 10% and about 40% ammonia, and about 5% and about 60% of the ammonium salt. It may be desirable in some cases to add water with the nitrogen salt but preferably the water content of the final product is between about 3% and about 25%.

In general products are prepared which do not salt out above 30° C. and preferably do not salt out at ordinary atmospheric temperature; nevertheless they contain a relatively high concentration of salts. The preferred products are saturated at a temperature between −30° C. and 30° C., i. e., a solid phase containing one or more of the constituents may be crystallized from solution by cooling it to a temperature within these limits.

It will be noted that the invention as above described comprises the incorporation of an ammonium salt with ammonia-urea-carbon dioxide solutions. However, it is not necessary that the ammonium salt be added as such, particularly in those cases where large quantities of free ammonia are present in the original solution. The ammonium salt may be formed in situ, e. g., by the addition of nitric or hydrochloric acid to the solution. In general the effects of the ammonium salts of the several strong inorganic acids are similar. However, they are not all equally soluble and accordingly larger quantities of one than another may be employed. For instance, ammonium nitrate possesses a higher solubility in such solutions than ammonium chloride, hence more of the nitrate may be added with a correspondingly greater reduction in salting out temperature than is obtainable with the chloride.

*Example 1.*—An autoclave effluent obtained from the reaction of ammonia and $CO_2$ in the molar ratio 4.4:1.0 (with about 80% conversion of the $CO_2$) contains:

|  | Per cent |
|---|---|
| Urea | 40.4 |
| Ammonia | 39.9 |
| Carbon dioxide | 7.5 |
| Water | 12.2 |

Crystallization of salts from this solution commences at about −1° C.

To 100 parts of this solution 158.9 parts of a composition consisting of 138.2 parts ammonium nitrate and 20.7 parts water are added. The composition thus formed contains about

|  | Per cent |
|---|---|
| Ammonium nitrate | 53.4 |
| Urea | 15.6 |
| Ammonia | 15.4 |
| Carbon dioxide | 2.9 |
| Water | 12.7 |

It has a vapor pressure of 0.7 atmospheres absolute at 30° C. No crystallization of salts from the solution takes place at temperatures as low as −8° C. The product may be placed in transportable closed containers and transported at atmospheric pressure under varying weather conditions without constituents crystallizing out and without losses due to vaporization.

*Example 2.*—A solution consisting of

| | Per cent |
|---|---|
| Ammonium nitrate | 56.3 |
| Urea | 16.4 |
| Ammonia | 13.9 |
| Water | 13.4 | and having a salting out temperature of −5° C., may be converted to a solution having the same composition and salting out temperature as the product prepared in Example 1, by adding 5.3 parts of ammonium carbamate to 100 parts of the solution.

*Example 3.*—An aqueous urea-ammonia-carbon-dioxide solution obtained as effluent in the synthesis of urea and comprising

| | Per cent |
|---|---|
| Urea | 39.8 |
| Ammonia | 33.7 |
| Carbon dioxide | 6.6 |
| Water | 19.9 | has a salting out temperature of about −1° C. and a vapor pressure at 30° C. of 3.7 atmospheres absolute.

To 100 parts of this solution are added 20 parts of ammonium chloride, thus forming a solution comprising

| | Per cent |
|---|---|
| Ammonium chloride | 16.7 |
| Urea | 33.2 |
| Ammonia | 28.0 |
| Carbon dioxide | 5.5 |
| Water | 16.6 |

Crystallization of salts from this solution does not take place above 1° C. Crystallization of $NH_4Cl$ begins at this temperature or slightly below. The vapor pressure of the solution at 30° C. is 2.4 atmospheres absolute.

*Example 4.*—To 100 parts of autoclave effluent comprising

| | Per cent |
|---|---|
| Urea | 43.3 |
| Ammonia | 36.6 |
| Carbon dioxide | 7.1 |
| Water | 13.0 | from which urea or a urea complex commences to crystallize out at about 7° C. are added 30.4 parts of a slurry consisting of 21.7 parts ammonium chloride and 8.7 parts water. The resultant solution has the same composition and accordingly the same salting out temperature and vapor pressure as the product of Example 3.

*Example 5.*—A solution resulting from the synthesis of urea from carbon dioxide and ammonia, comprises

| | Per cent |
|---|---|
| Urea | 39.8 |
| Ammonia | 33.7 |
| Carbon dioxide | 6.6 |
| Water | 19.9 |

At about −1° C. or below urea or a urea complex begins to crystallize out. The vapor pressure of the solution at 30° C. is about 3.7 atmospheres absolute.

To 100 parts of this solution about 20 parts of ammonium nitrate are added forming a solution comprising

| | Per cent |
|---|---|
| Ammonium nitrate | 16.7 |
| Urea | 33.1 |
| Ammonia | 28.1 |
| Carbon dioxide | 5.5 |
| Water | 16.6 |

This solution does not begin to salt out above −3° C. and has a vapor pressure at 30° C. of 2.5 atmospheres absolute.

*Example 6.*—To 100 parts of a solution comprising:

| | Per cent |
|---|---|
| Urea | 39.8 |
| Ammonia | 33.7 |
| Carbon dioxide | 6.6 |
| Water | 19.9 | the salting out temperature of which is about −1° C. and whose vapor pressure at 30° C. is about 3.7 atmospheres absolute, are added about 40 parts of ammonium nitrate, thus yielding a solution comprising about

| | Per cent |
|---|---|
| Ammonium nitrate | 28.6 |
| Urea | 28.4 |
| Ammonia | 24.1 |
| Carbon dioxide | 4.7 |
| Water | 14.2 |

No crystallization takes place above about 4° C. Ammonium nitrate begins to crystallize out from this solution at about 4° C. or below. The vapor pressure of the solution at 30° C. is only 1.8 atmospheres absolute.

*Example 7.*—In the synthesis of urea from ammonia and carbon-dioxide used in the molar ratio of 4.1:1 under such conditions that about 81% conversion of the carbon-dioxide is effected, an effluent is obtained from which urea or a urea complex begins to crystallize out at about 6° C.

To 100 parts of this autoclave effluent are added 52 parts of an aqueous 83% ammonium nitrate solution, thus yielding a solution comprising

| | Per cent |
|---|---|
| Ammonium nitrate | 28.6 |
| Urea | 28.4 |
| Ammonia | 24.1 |
| Carbon dioxide | 4.7 |
| Water | 14.2 |

The solution possesses the same salting out characteristics and vapor pressure as the solution of Example 6.

*Example 8.*—A solution prepared in the manner of Example 7 contains

| | Per cent |
|---|---|
| Ammonium nitrate | 28.5 |
| Urea | 28.5 |
| Ammonia | 24.2 |
| Carbon dioxide | 4.7 |
| Water | 14.2 |

166 parts of this solution and 890 parts of superphosphate (7.9% P or 18% $P_2O_5$), 160 parts of commercial potassium sulfate (92% $K_2SO_4$ or 50% $K_2O$), 40 parts ammonium sulfate (21% N), 743 parts of an inert filling material are thoroughly mixed yielding a product containing about

| | Per cent |
|---|---|
| Nitrogen | 4 |
| $P_2O_5$ (3.5% P) | 8 |
| $K_2O$ (3.3% K) | 4 |

*Example 9.*—A solution prepared, for example, as in Example 1, comprises:

| | Per cent |
|---|---|
| Ammonium nitrate | 53.2 |
| Urea | 15.6 |
| Ammonia | 15.6 |
| Carbon dioxide | 2.9 |
| Water | 12.7 |

This composition does not salt out at temperatures above −8° C. and at 30° C. has a vapor pressure of only 0.7 atmospheres absolute.

207 parts of this solution are intimately mixed with 890 parts superphosphate (18% $P_2O_5$), 160 parts of commercial potassium chloride (80% KCl or 50% $K_2O$), and 743 parts inert filler. The resultant mixture contains about

| | Per cent |
|---|---|
| N | 4 |
| $P_2O_5$ | 8 |
| $K_2O$ | 4 |

A similar product may be prepared employing potassium sulfate instead of the potassium chloride.

*Example 10.*—A solution comprising

| | Per cent |
|---|---|
| Ammonium chloride | 19.3 |
| Urea | 25.8 |
| Ammonia | 27.5 |
| Carbon dioxide | 6.2 |
| Water | 21.2 | does not salt out at a temperature above about 5° C. and has a vapor pressure at 30° C. of about 1.9 atmospheres absolute.

146 parts of this solution are intimately mixed with 890 parts of superphosphate, 160 parts of commercial potassium chloride (80% KCl), 106 parts of ammonium sulfate (21%N), and 698 parts of an inert filler. The resultant mixture contains about

| | Per cent |
|---|---|
| N | 4 |
| $P_2O_5$ | 8 |
| $K_2O$ | 4 |

As in Example 9, the potassium chloride may be replaced by potassium sulfate.

*Example 11.*—A solution comprising

| | Per cent |
|---|---|
| Ammonium chloride | 15.1 |
| Urea | 26.3 |
| Ammonia | 33.9 |
| Carbon dioxide | 6.3 |
| Water | 18.4 | does not salt out at a temperature above about 2° C. The vapor pressure of this solution at 30° C. is approximately 3 atmospheres absolute.

118 parts of this solution are intimately mixed with 890 parts superphosphate (18% $P_2O_5$), 160 parts of commercial potassium chloride (80% KCl), 136 parts of ammonium sulfate, and 696 parts of an inert filler. The mixture contains about

| | Per cent |
|---|---|
| N | 4 |
| $P_2O_5$ | 8 |
| $K_2O$ | 4 |

*Example 12.*—A solution resulting from the synthesis of urea from carbon dioxide and ammonia contains:

| | Per cent |
|---|---|
| Urea | 42.9 |
| Ammonia | 36.4 |
| Carbon dioxide | 7.8 |
| Water | 12.9 |

100 parts of this solution are cooled to about +4° C. and are allowed to crystallize at that temperature. When crystallization is substantially complete, the crystalline portion is separated from the solution. About 12 parts of ammonium nitrate are then dissolved in this solution, yielding a solution from which salts do not begin to crystallize out until the temperature of the solution is reduced substantially below 4° C.

*Example 13.*—A solution is prepared by adding ammonium chloride to urea autoclave effluent to raise the crystallization temperature to about 23° C. The solution so formed contains about

| | Per cent |
|---|---|
| Urea | 28.8 |
| Ammonia | 33.3 |
| Carbon dioxide | 10.7 |
| Water | 18.2 |
| Ammonium chloride | 9.0 |

At about 23° C. or below, a $CO_2$ salt begins to crystallize from this solution.

In order to reduce the salting out temperature and the $CO_2$ content, 100 parts of this solution are cooled to 0° C. and allowed to crystallize. When crystallization has been completed the solution and crystalline material are separated. A substantial separation of $CO_2$ salts is thus effected without materially reducing the percentage ammonia content of the solution.

*Example 14.*—A solution prepared according to one of the methods described above contains about

| | Per cent |
|---|---|
| Ammonium nitrate | 52.1 |
| Urea | 15.1 |
| Ammonia | 14.2 |
| Carbon dioxide | 6.2 |
| Water | 12.4 |

At ordinary atmospheric temperatures the solution contains part of the $CO_2$ as a salt in solid phase. 100 parts of the solution are heated under suitable conditions so as to vaporize about 5% of the total weight of the solution. The solution remaining contains an only slightly reduced percentage of ammonia and very materially less carbon dioxide. No salt crystallizes out of this solution at temperatures above about +1° C.

We claim:
1. The method of preparing a liquid composition suitable for transportation and storage and for incorporation with solid acidic fertilizer materials from a product derived from the synthesis of urea containing urea, ammonia, carbon dioxide and water in amounts such that urea crystallizes out from said product at a temperature above that at which compounds of ammonia and carbon dioxide crystallize therefrom, which comprises incorporating with said product a salt from the group consisting of the ammonium and alkali-metal salts of the strong inorganic acids in amount sufficient to materially lower the temperature at which urea crystallizes from said product.

2. The method of preparing a liquid composition suitable for transportation and storage and for incorporation with solid acidic fertilizer materials from a product derived from the synthesis of urea containing urea, ammonia, carbon dioxide and water in amounts such that urea crystallizes out from said product at a temperature between about −30° C. and 30° C. without the crystallization therefrom of compounds of ammonia and carbon dioxide, which comprises incorporating with said product a salt from the group consisting of ammonium nitrate and ammonium chloride in amount sufficient to prevent crystallization of urea from said product at said temperature.

3. The method of preparing a liquid composition suitable for transportation and storage and for incorporation with solid acidic fertilizer materials from a urea synthesis autoclave effluent containing free ammonia which comprises incorporating in the effluent an ammonium salt of a strong inorganic acid whereby the vapor pressure of ammonia is reduced, and distilling the effluent to expel therefrom at least a portion of the carbon dioxide while retaining in the composition resulting from this distillation treatment at least a portion of the initial free ammonia content of the effluent, the amount of ammonium salt added to the effluent and the degree of removal therefrom of carbon dioxide being such that the resulting composition is a liquid at a temperature within the range −30° C. to 30° C. and the presence in the composition of the ammonium salt of a strong inorganic acid materially lowers the temperature at which urea crystallizes from the liquid composition.

4. The method of preparing a liquid composition suitable for transportation and storage and for incorporation with solid acidic fertilizer materials from a urea synthesis autoclave effluent from which upon cooling a compound of ammonia and carbon dioxide crystallizes out at a temperature above that at which urea crystallizes therefrom, which comprises incorporating with said effluent a salt from the group consisting of the ammonium and alkali-metal salts of the strong inorganic acids in amount sufficent to materially lower the temperature at which urea crystallizes from the effluent, and then crystallizing from the thus treated effluent a salt containing a portion of the carbon dioxide and ammonia originally contained therein in amount sufficient to leave a mother liquor which is a liquid at a temperature within the range of −30° C. to 30° C., and separating said mother liquor from the solid crystallized therefrom.

5. The method of reducing the carbon dioxide content of a urea synthesis autoclave effluent containing free ammonia, which comprises heating said effluent together with a salt from the group consisting of the ammonium and alkali-metal salts of the strong inorganic acids to selectively distill out carbon dioxide while inhibiting the vaporization of free ammonia.

6. As a new composition of matter a liquid composition comprising, as constituents, urea, ammonia, carbon dioxide, water, and a salt from the group consisting of the alkali-metal and ammonium salts of the strong inorganic acids, said solution being saturated with at least one of said urea and salt at a temperature between about −30° C. and about 30° C. and containing sufficient of said salt to materially reduce the temperature at which urea crystallizes from said liquid composition.

7. As a new composition of matter a liquid composition comprising by weight between 10% and 40% of urea, between 10% and 40% of ammonia, between 2% and 14% of carbon dioxide, between 3% and 25% of water, and between 5% and 60% of a compound of the group consisting of ammonium nitrate and ammonium chloride, and from which no constituents begin to crystallize out at temperatures above about 5° C.

8. The method of producing a fertilizer which comprises treating a product derived from the synthesis of urea by the procedure of claim 1 and mixing the resulting liquid composition with a monocalcium acid phosphate material.

9. The method of producing a fertilizer which comprises treating a product derived from the synthesis of urea by the procedure of claim 2 and mixing the resulting liquid composition with a superphosphate.

10. The method of producing a fertilizer which comprises mixing the liquid composition defined by claim 6 with a monocalcium acid phosphate material.

11. The method of producing a fertilizer which comprises mixing the liquid composition defined by claim 7 with a monocalcium acid phosphate material.

WALTER H. KNISKERN.
WILLIAM C. KLINGELHOEFER.